United States Patent [19]
Aldebert et al.

[11] Patent Number: 5,923,664
[45] Date of Patent: Jul. 13, 1999

[54] METHOD AND APPARATUS PROVIDING A MULTIPORT PHYSICAL INTERFACE TO HIGH SPEED PACKET NETWORKS

[75] Inventors: Jean-Paul Aldebert, Vence; Jean Calvignac, La Gaude; Daniel Orsatti, Cagnes S/Mer; Fabrice Verplanken, La Gaude; Jean-Claude Zunino, Nice, all of France

[73] Assignee: International Business Machines Corporation, Armonk, N.Y.

[21] Appl. No.: 08/824,941

[22] Filed: Mar. 27, 1997

[30] Foreign Application Priority Data

Mar. 28, 1996 [EP] European Pat. Off. .............. 96480035

[51] Int. Cl.$^6$ ................................ H04J 3/16; H04J 3/22; H04J 3/24
[52] U.S. Cl. .......................... 370/465; 370/381; 370/476
[58] Field of Search ..................................... 370/378, 379, 370/381, 382, 383, 280, 294, 298, 300, 301, 362, 465, 902, 905, 474, 476; 395/872, 856, 500, 800, 200.01, 200.02

[56] References Cited

U.S. PATENT DOCUMENTS

| | | | |
|---|---|---|---|
| 5,124,977 | 6/1992 | Kozaki et al. ............................ | 370/395 |
| 5,557,609 | 9/1996 | Shobatake et al. ...................... | 370/395 |
| 5,594,734 | 1/1997 | Worsley et al. .......................... | 370/395 |
| 5,668,798 | 9/1997 | Toubol et al. ........................... | 370/395 |
| 5,687,356 | 11/1997 | Basso et al. ............................. | 395/800 |
| 5,784,370 | 12/1995 | Rich ........................................ | 370/395 |

*Primary Examiner*—Chi H. Pham
*Assistant Examiner*—Steven Nguyen
*Attorney, Agent, or Firm*—Joscelyn G. Cockburn

[57] ABSTRACT

The invention discloses a method and an apparatus for implementing the physical interface in a network element connected to a packet network such as Asynchronous Transfer Mode (ATM) network. With the solution of the invention, the physical interface functions can be integrated on one chip for more than one network port. The physical interface is provided between port bit streams at media speed and word data flow transferred onto/from a bus which is under the control of the network equipment. The solution of the invention includes grouping logics and storage elements by islands of more than one port. Furthermore, the logics and storage elements for statistical counting operations can be grouped for a processing generalized to all ports. Finally, the solution of the present invention takes into account two characteristics of the physical interface which are the different rates between network link media speed and bus access rate and the technology of the high density static imbedded RAMs used for hardware integration. The Flip/Flop pointer RAMs of Flip/Flop data RAMs are duplicated and some interface RAMs are created to transfer control data between the islands and the generalized processing logical blocks.

12 Claims, 8 Drawing Sheets

METHOD AND APPARATUS PROVIDING A MULTIPORT PHYSICAL INTERFACE TO HIGH SPEED PACKET NETWORKS

FIELD OF THE INVENTION

This invention relates in general to networking communication system and more particularly to high speed packet networks such as Asynchronous Transfer Mode (ATM) networks.

BACKGROUND OF THE INVENTION

High speed networks generate problems of performance and hardware component integration at the physical interface of the networking equipement connected to their network links. In the network link physical interface the data flows exchanged at media speed are processed. This media speed process comprises controlling operations such as scrambling and descrambling, error code checking (most of them implying Cyclic Redundancy Checking calculations) etc... These operations require complex logics and need to be optimized to sustain high speeds.

FIG. 1 illustrates the physical interface sublayers necessary to connect equipment to the network. For each network link (5) a first physical interface sublayer (40) including connectors (43), magnetics (42), Phased Locked Loops and transceivers (41) is dependent on the type of medium (copper lines, optical fibers). The input bit stream data flows are then processed in the upper sublayer (30) which provides the functions of frame units delineating, descrambling, CRC checking in the Receive side and CRC generation, scrambling and bit stream encoding in the Transmit side. In the Receive side, the upper sublayer (30) receiving media speed data flow sends delineated frame units on an internal bus (20) where further processing will be perfomed in the network equipment. The data is sent to the internal bus at a different rate from the data reception rate which is media speed of the input links.

The ATM Forum Technical Committee has published a Physical Interface specification for 25.6 Mb/s over Twisted Pair Cable for ATM network node connection to a private ATM network equipement following the User Network Interface (UNI). This specification incorporated herein by reference, describes the media dependant sublayer (so called PMD, Physical Media Dependent sublayer) and the upper sublayer, the Transmission Convergence (TC) sublayer. FIG. 2 illustrates the process performed in the TC sublayer in the Receive side. The bit stream data flow coming from the PMD sublayer is first decoded by an NRZI (Non Return to Zero Inverted) decoder (50), and deserialized as a five bit data flow to be, in a next step (52) decoded from 5 bits to 4 bits to form a data nibble, the symbols are aligned, the cell delineation being supported by the X_X and X_4 escape commands identified and transmitted, octet aligned (56); the nibbles are then descrambled (54), using the output of the PRNG (Pseudo-Random Number Generator) which is itself reset by the X_X signal; the cell headers are checked (56) by CRC calculations. The cells are sent to the internal bus of the ATM forwarder sublayer responsible for the ATM processing and routing. In the Transmit side the cell stream is scrambled, converted into nibbles and coded into a bits stream sent to the PMD sublayer.

The physical interface sublayer such as the TC sublayer for ATM networks requires for its hardware implementation the use of logic circuits and static memories which are today the most used components for high speed networks. The problem encountered by the hardware designers to optimize the hardware implementation of these functions is the limited space and the cost of components.

The problem becomes even more crucial as, with the development of high speed network equipment for campus networks, users require more and more hardware concentration. In the IBM TURBOWAYS 8282 ATM workgroup concentrator as well as in the VIRATA switch of ATM ltd, the Transmission Convergence ATM sublayer of the 25.6 Mb/s physical interface for one port is provided on one chip.

With the emerging request for more and more concentration, there is a need in the networking industry for integration of the multiport physical interface layer hardware implementation. This support for multiport attachment implies a higher complexity with the functions of multiplexing/demultiplexing of data flows. The hardware structure, in the view of integration, needs to maximize the sharing of logics and memories between port data flows. Moreover, some specific components such as imbedded static RAMs allow hardware integration because of their high density; by the way, this technology raises new problems for shared accesses. These memories cannot be simultaneously accessed by several resources, this is not the case when registers are used for sharing of data. Finally, the implementation of network physical interface has to take into account for resources sharing the different input and output data flow rates. In the Receive side the input multiport data flows are at media speed while the output multiplexed data flow is sent to one internal bus of the network equipment with a rate imposed by an external control unit.

SUMMARY OF THE INVENTION

It is an object of the invention to provide a hardware structure performing the physical packet network interface for more than one network link.

It is a third object of the invention to limit the number of hardware components in order to allow hardware integration.

In the network physical interfaces, only the upper sublayer is not media dependent; only the hardware implementation of the upper sublayer of the physical interface is optimized with the solution of the present invention. The invention discloses a method and a hardware structure supporting the upper sublayer physical interface for more than one network port.

With the solution of the invention the number of hardware components minimized and the mechanisms of storage control allow the use of high density components for hardware integration. The invention discloses also an apparatus implementing the steps of the method which can be used in the interface cards of the high speed networks equipment.

More particularly, the method and the apparatus of the invention can be used for ATM networks where the packets are ATM cells and the interfacing functions are defined by the ATM Forum Technical Committee as the Transmission Convergence sublayer of 25.6 Mb/s.

DETAILED DESCRIPTION OF THE PREFERRED EMBODIMENT

The solution of the invention discloses mechanisms for sharing logics and memories which can be used for optimizing the hardware implementation of multiport network physical interface functions such as the CRC generation and checking of 10 Mb/s and 100 Mb/s Ethernet ports or Token Ring and FDDI physical interfaces. More particularly, one embodiment of the invention is a method and a hardware structure to support the Transmission Convergence sublayer of the 25.6 Mb/s physical interface as specified by the ATM Forum Technical committee. The hardware structure of the preferred embodiment of the present invention supports 12 ATM ports at 25.6 Mb/s and allows its hardware integration on one chip.

For simplification, even if the hardware structure of the present invention can be used for the Receive and Transmit sides, the solution of the preferred embodiment describes the Receive side only.

Figure 3:
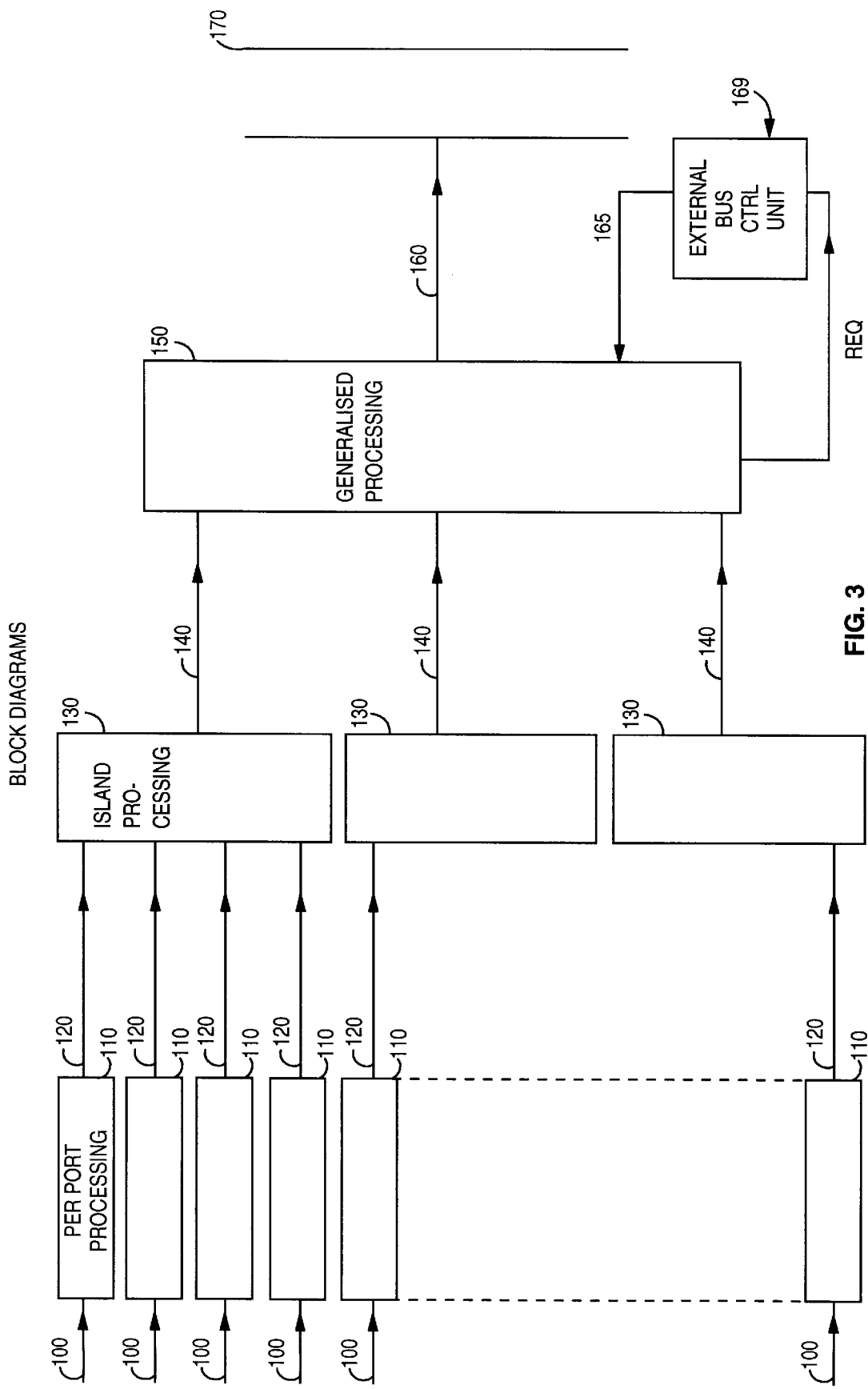
FIG. 3 illustrates the logical blocks and the data flow of the hardware structure according to the present invention.

FIG. 3 illustrates the main logical blocks of the structure. The bit data flows enter per port (100) at media speed; the output port multiplexed data flow (160) is sent onto an internal bus (170) of the network equipment. The control of the rate of the output data flow transfer onto the internal bus is shared with the upper layers implemented in the network equipment containing the physical interface. For the implementation of the ATM TC, the output flow is sent via the internal bus to the 'ATM layer' defined by the ATM Forum Technical committee and is incorporated herein by reference. The ATM layer which processes the ATM cells, shares the access to the internal bus with the TC physical interface sublayer. The per-port processing logical blocks (110) provide the minimum set of functions to be performed per port; their output are byte data streams (120). The processing starts being grouped by islands of more than one port in the further logical blocks 130 where storage elements and logics are shared between the ports data flows. The maximum number of ports N which can be grouped by island depends on the port media speed and the Read and Write operations timing capacities of the storage elements. As explained later in the document, the maximum number of ports is 4 per island in the preferred embodiment of the invention with 25.6 Mb/s ports and current embedded static RAMs technology. The data processed by island is read (140), multiplexed and sent (160) onto the bus (170) in with the logical block 150. The logical block 150 comprises all the operations that is required process for all ports and thus, avoids duplication of logics and storage elements. The evolution of memories technology can allow increased concentration of ports in the island logic blocks. The hardware structure as described presents three hierarchical levels which are the per-port, per-island and generalized levels; the solution of the present invention can also be used if the hierarchical structure presents more or less levels. One can imagine that the future embedded memories technology could allow, on one chip, all the functions shared by all ports (only one generalized level).

Figure 1:
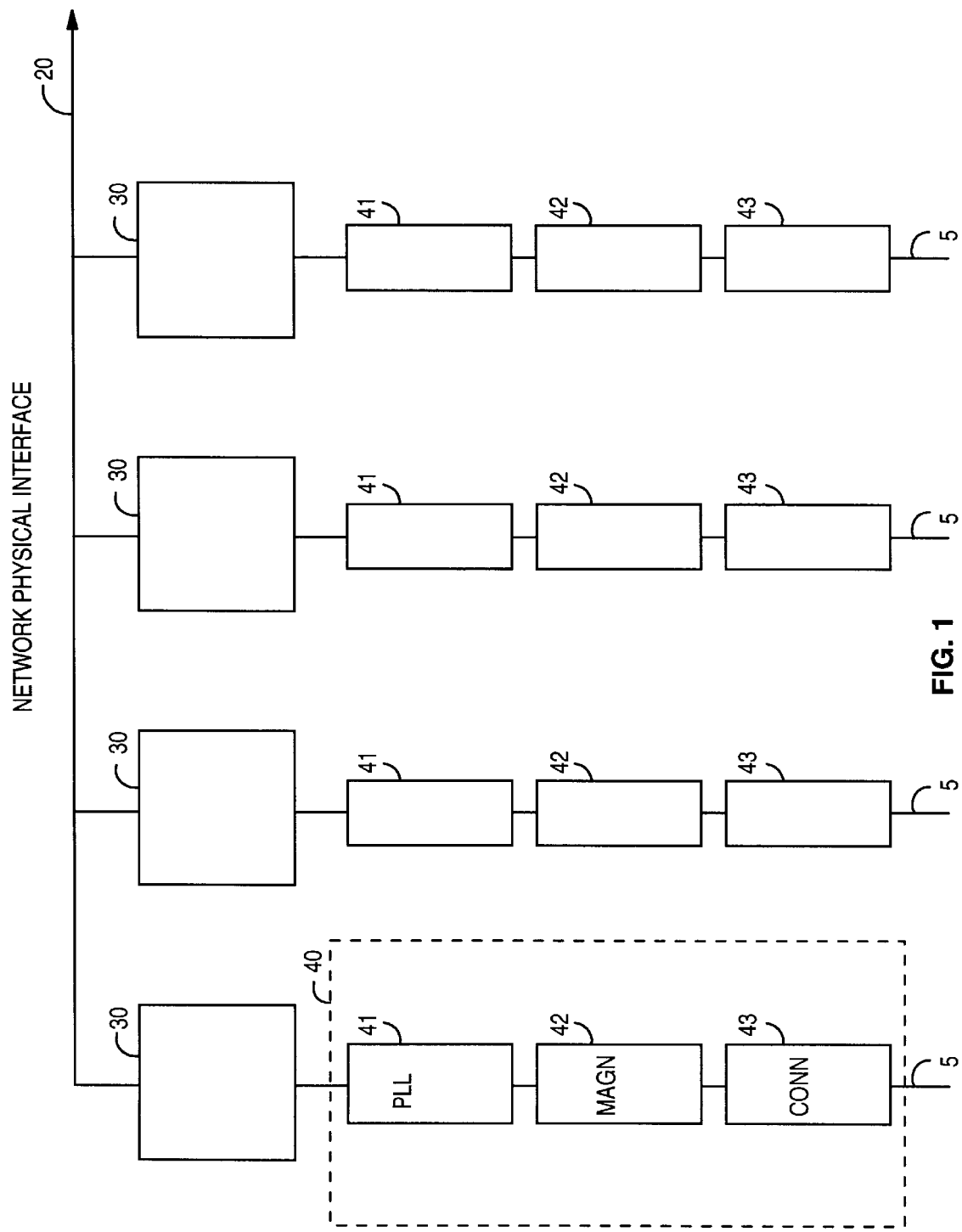
FIG. 1 shows the different sublayers of the physical network interface in a network node.
Figure 2:
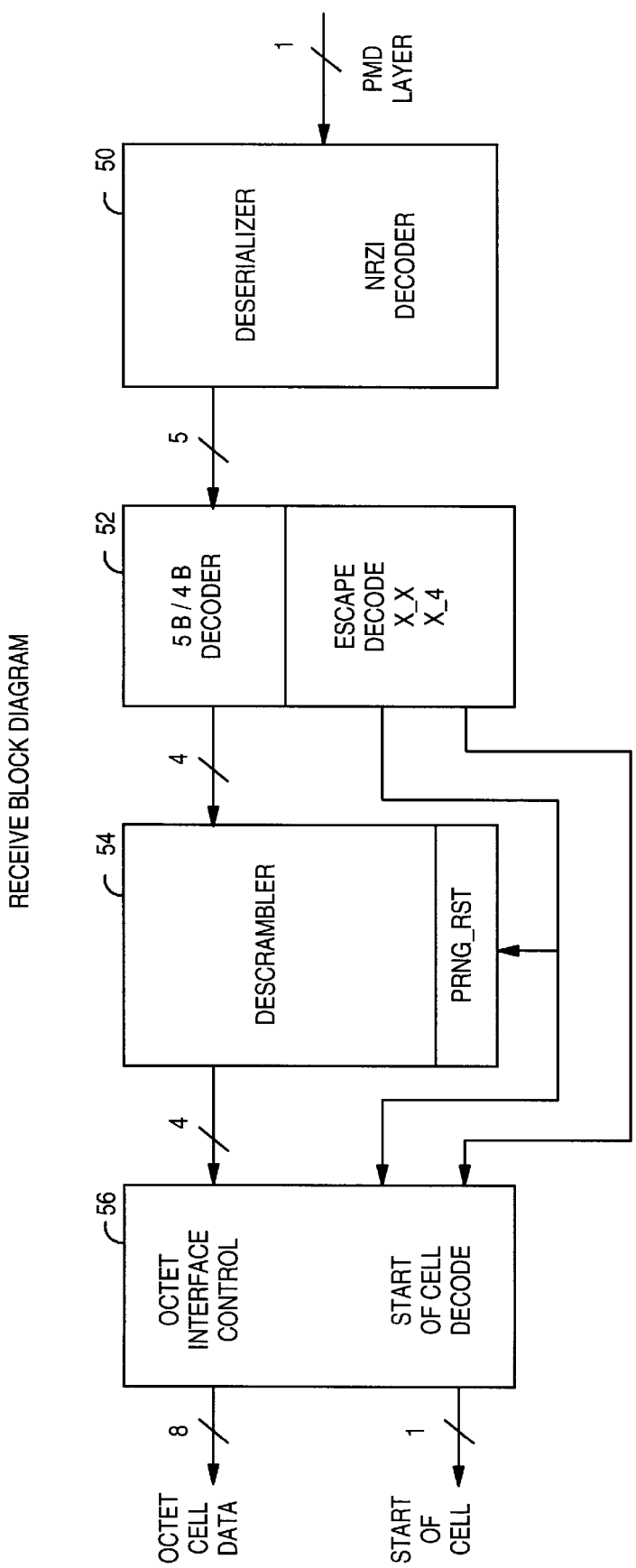
FIG. 2 illustrates the Transmission Convergence sublayer of the 25.6 Mb/s physical interface as specified by the ATM Forum Technical Committee.
Figure 4:
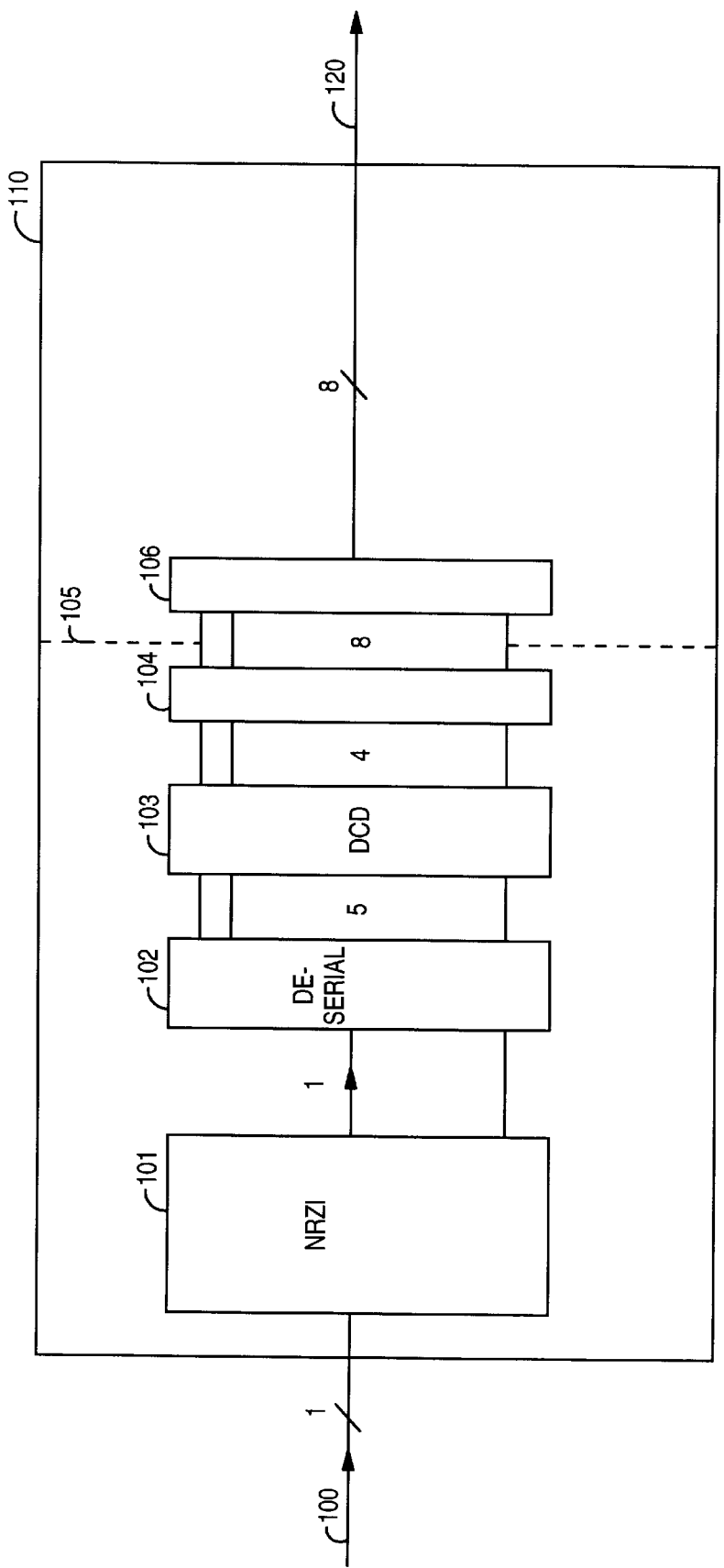
FIG. 4 illustrates the per-port processing logical block according to the present invention.

FIG. 4 illustrates the per-port processing block diagram of the ATM TC sublayer for 25.6 Mb/s. The input bit stream (100) is at media speed under the network bit clock. According to the ATM Forum specifications, incorporated herein by reference, described in FIG. 2, the bit data stream is NRZI decoded (101), deserialized and symbol aligned (102) into 5 bits symbols which are decoded into 4 bits (103) data nibbles and 2 command bits. The data nibbles are byte reassembled in the byte register (104). The 2 command bits, not represented on the FIG. 4 are stored for usage as input and enabling of byte counting and cell delineating in a further processing. The bit clock is translated (105) from the network clock to the internal clock of the network equipment, the resynchronization being performed in the register 106. The byte output data stream 120 is not word reassembled in this per-port processing block because this operation can be performed in another part of the structure for more than one port.

In FIG. 4 the bit clock changing (105) is preferably performed on a parallel bit stream rather than on a serial bit stream (between 101 and 102) which typically calls more complex oversampling methods.

Figure 5:
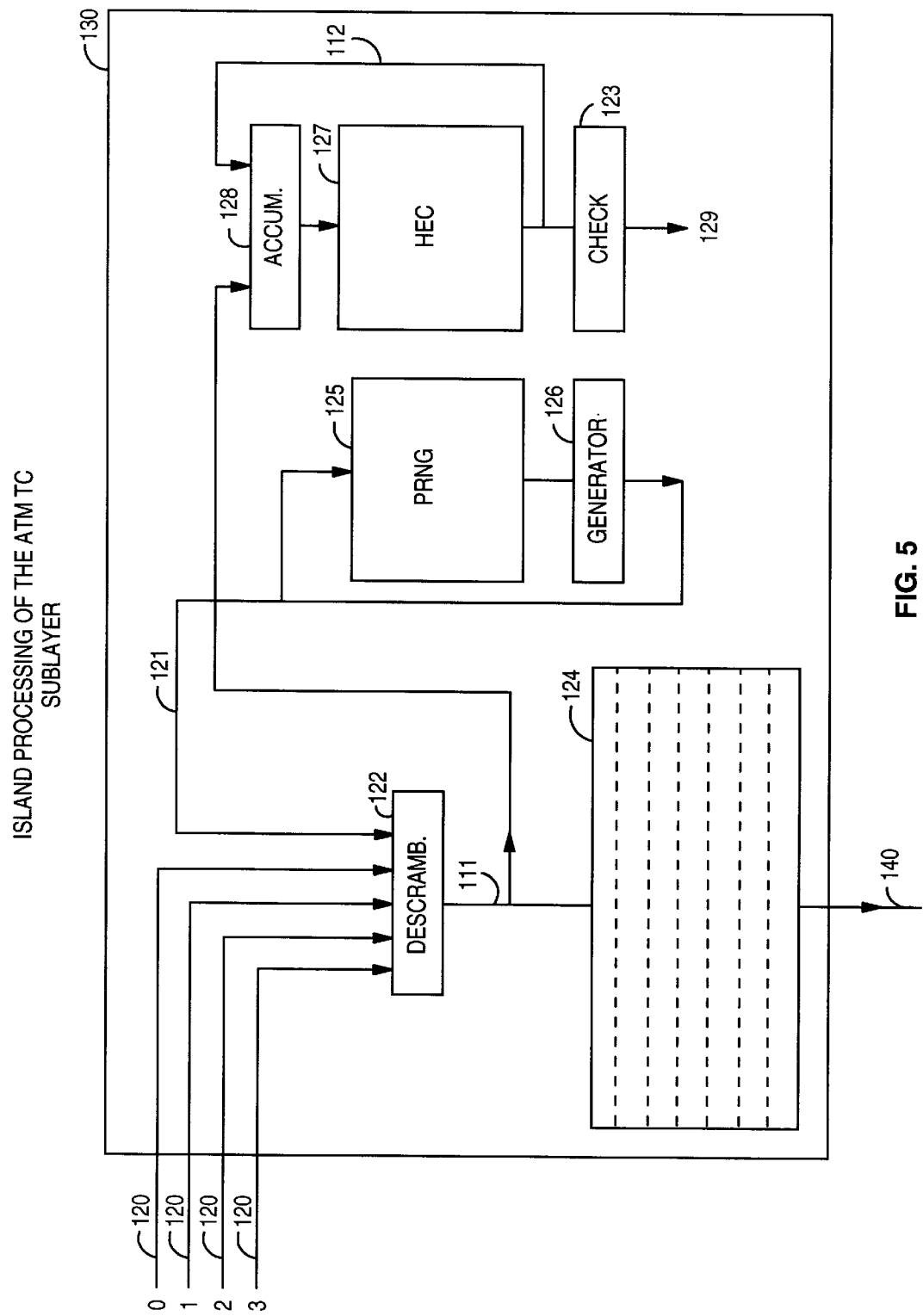
FIG. 5 illustrates the island processing logical block according to the present invention.

FIG. 5 illustrates the island processing block diagram of the ATM TC sublayer. This block comprises logics (125, 127), a storage element for data (124) and storage elements for control information (125, 127). 4 port byte streams (120) forming an island input entity enter a first logic circuit for multiplexing and descrambling (122). All the 53 bytes of an ATM cell need to be descrambled at reception. The descrambling logic needs the input (121) of the Pseudo Random Number Generator (PRNG) data stored in a storage element (125) processed on by a polynomial generator logic (126). The descrambled bytes (111) are sent to the logic circuit for cell Header Error Control checking (128) which also receives the previously accumulated HEC (112) from the storage element (127). The accumulated HEC (127) is used as input by the logic (123) for HEC error decoding. HEC error signal is sent (129) for further processing by the HEC error decoding (123). The output byte flow (111) is also reassembled into four byte words in a data storage element (124) a per-port status area is set at 'word ready'. The data in the data storage elements (124) will be read as words of 4 bytes (140). In the just described island-processing logical block of the preferred embodiment, the amount of logics, which are quite complex, has been maximized, shared between 4 ports and thus avoid duplication. Other additional logics and storage elements not represented in this figure are part of this island processing logical block such as the byte counting and cell delineating which send a signal such as the HEC error signal 129 for further processing.

Figure 6:
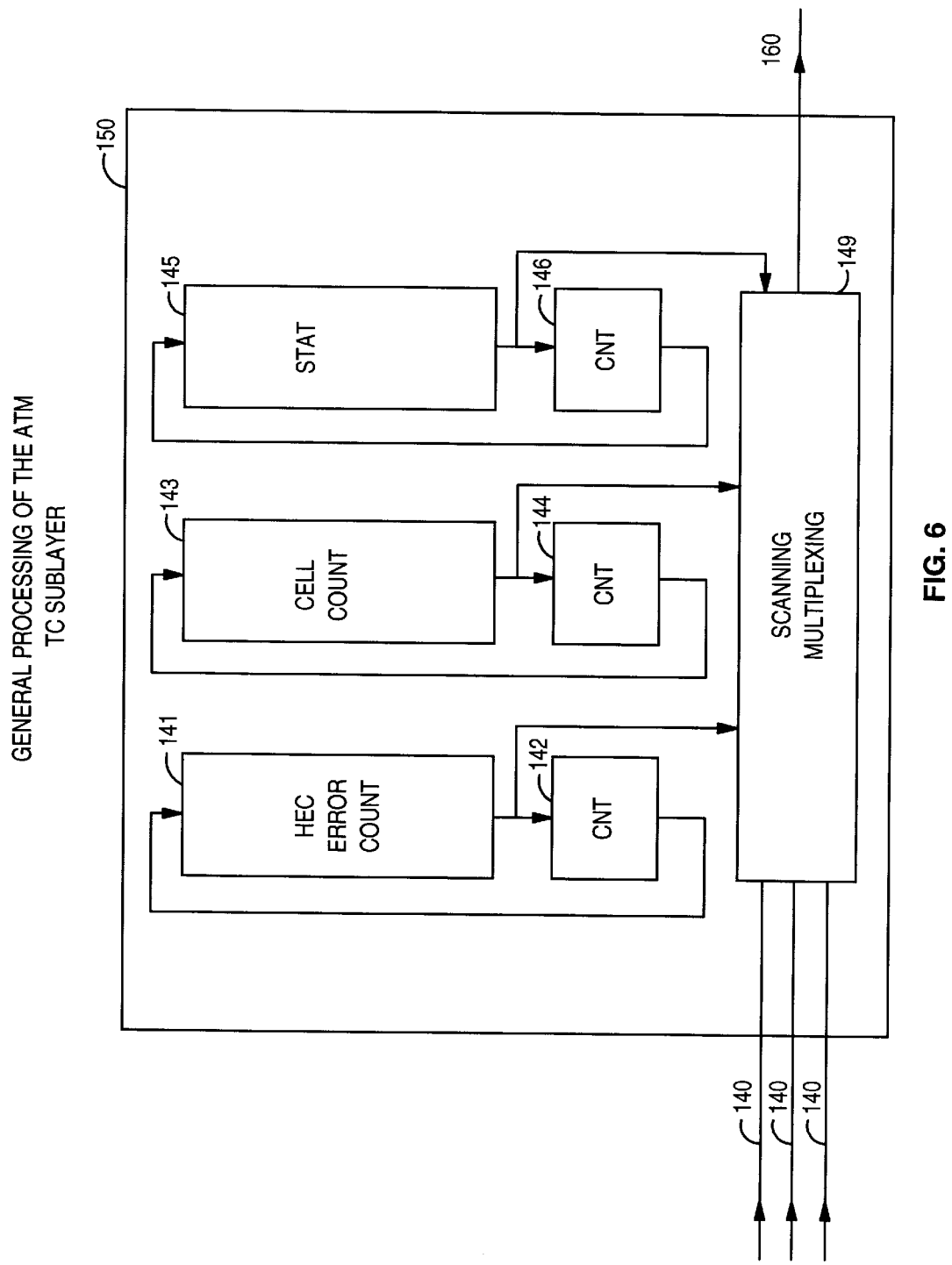
FIG. 6 illustrates the logical block of the processing generalized to all ports according to the present invention.

FIG. 6 illustrates the logical block of the processing generalized for all ports. The main purpose of that block is to scan (149) all the per-port status areas (one per island). For each 'word ready' read, the corresponding 4 byte word stored in the island data storage elements in each island processing logical block (124) is read and the port status is reset; the words read are multiplexed onto the internal bus (170) of network equipment. However, some functions requiring a quite complex logic are performed also on all the islands and thus are generalized to all ports in this same logical block. Such functions which are not part of the ATM Forum specifications but however required for physical layer network management may be statistical counting operations (146) such as HEC errors and cell number counting (142, 144). These functions use storage elements (141, 143, 145) to save the intermediate values of the counters of each port and access some information in storage elements filled up by the island processing as described later in FIG. 7. Each counter supports a process generalized to all ports. The data stored in 141, 143, 145 storage elements are also multiplexed on the output stream (160). The data constitute specific control data ATM cells. In another embodiment the words of storage elements 141, 142, 143, 145 can be read and sent by an independant mechanism to a control bus different from the bus for data (170).

Figure 8:
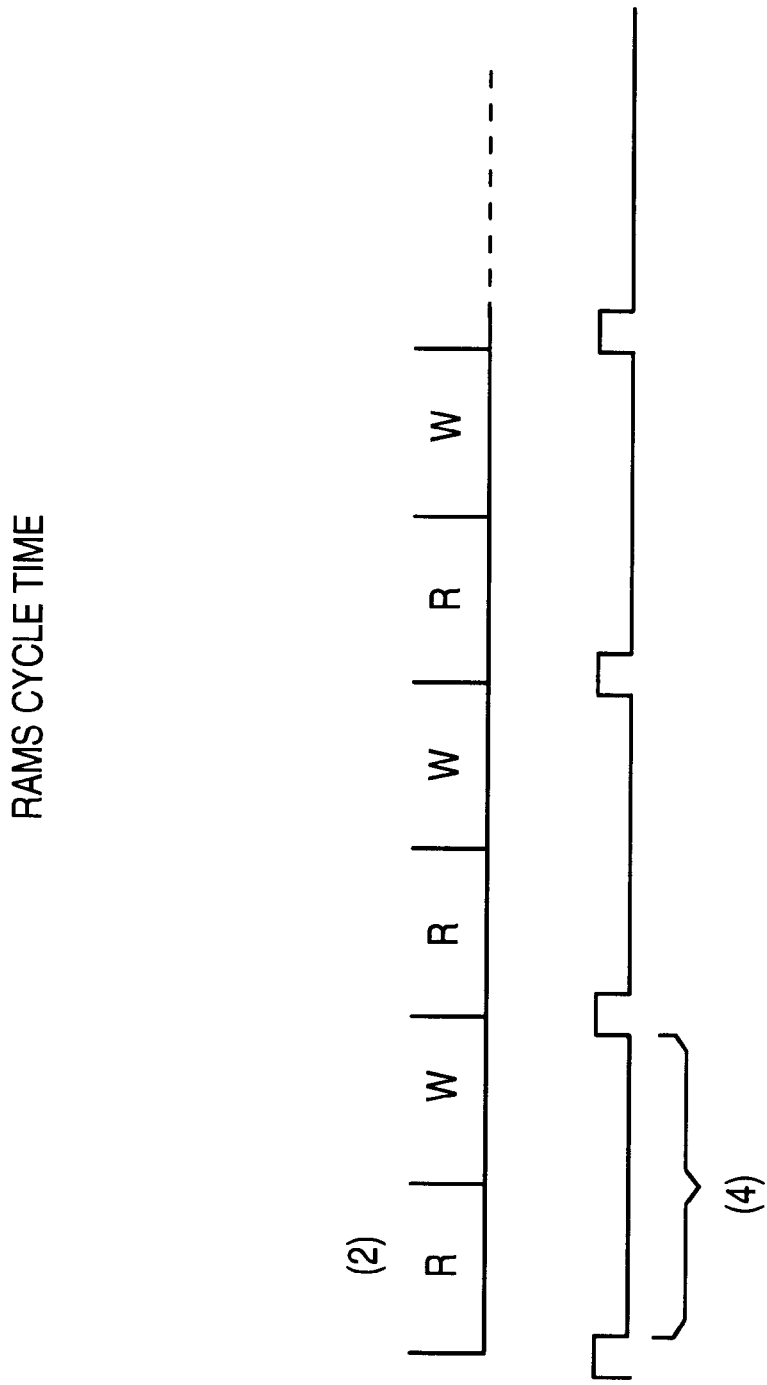
FIG. 8 shows the Read/write access timing to the imbedded static RAMS.

One constraint appears on the structure of the invention because of the technology used for storage. Due to the objective of optimization of the size of components in the view of hardware integration, the storage elements used are static embedded RAMs. More particularly, in the preferred embodiment FPGA (Field Programmable Gate Array) embedded RAMs are used. This type of storage, compared to the most used registers, provides the required high density of data stored but imposes some limitations as for their Read and Write accesses. In a register the Read and Write operations can be performed simultaneously by different resources. For imbedded static RAMS, the read and write operations cannot be simultaneous. Moreover, in order to minimize the cycle time of the RAMs, as illustrated in FIG. 8, it has been chosen to always alternate Read and Write operations (2) in one cycle (4); this limitation allows, however, a shorter cycle time than if the order for performing Read and Write operations is free. This constraint on the RAMs will impose in the implementation of island processing that the data storage elements will be always accessed by consecutive Read/Write operations. This is taken into account in the calculation of the maximum number of ports per island.

The calculation of the maximum number of ports grouped in one island for the ATM 25.6 Mb/s 12 ports upper sublayer physical interface is explained as follows. While the logic for data processing (122) in island logical blocks performs a write operation in the data RAMs (124) during one byte arrival time, in parallel, the logics (126, 123) of the island processing perform in the control information RAMs one Read and one Write operation at each byte time. The maximum number of ports to be grouped in one island will be calculated on the basis of the control information byte time processing (126, 123) which includes more steps than the data byte processing (122). Each Read or Write operation takes 31.25 ns in the RAMs, this cycle time being defined by the network equipment clock. The byte time of the 25.6 Mb/s link is 312.5 ns, this byte time being defined by the transmitting station, it could slightly differ from the network equipment clock. We have, with N ports and in one byte time:

$$312.5 = 2 \times N \times 31.25 \rightarrow N = (312.5/2) \times 31.25 = 5$$

To take into account the worst case condition which is a network equipment clock faster than the network clock, the value 5 is not taken as is but should be degraded to the closest smaller integer: 4. There is no such limitation for the number of islands in the hardware structure; the number of islands will depend on the internal bus (170) capacity, taking in consideration its sharing with other structures of the network equipment.

Figure 7:
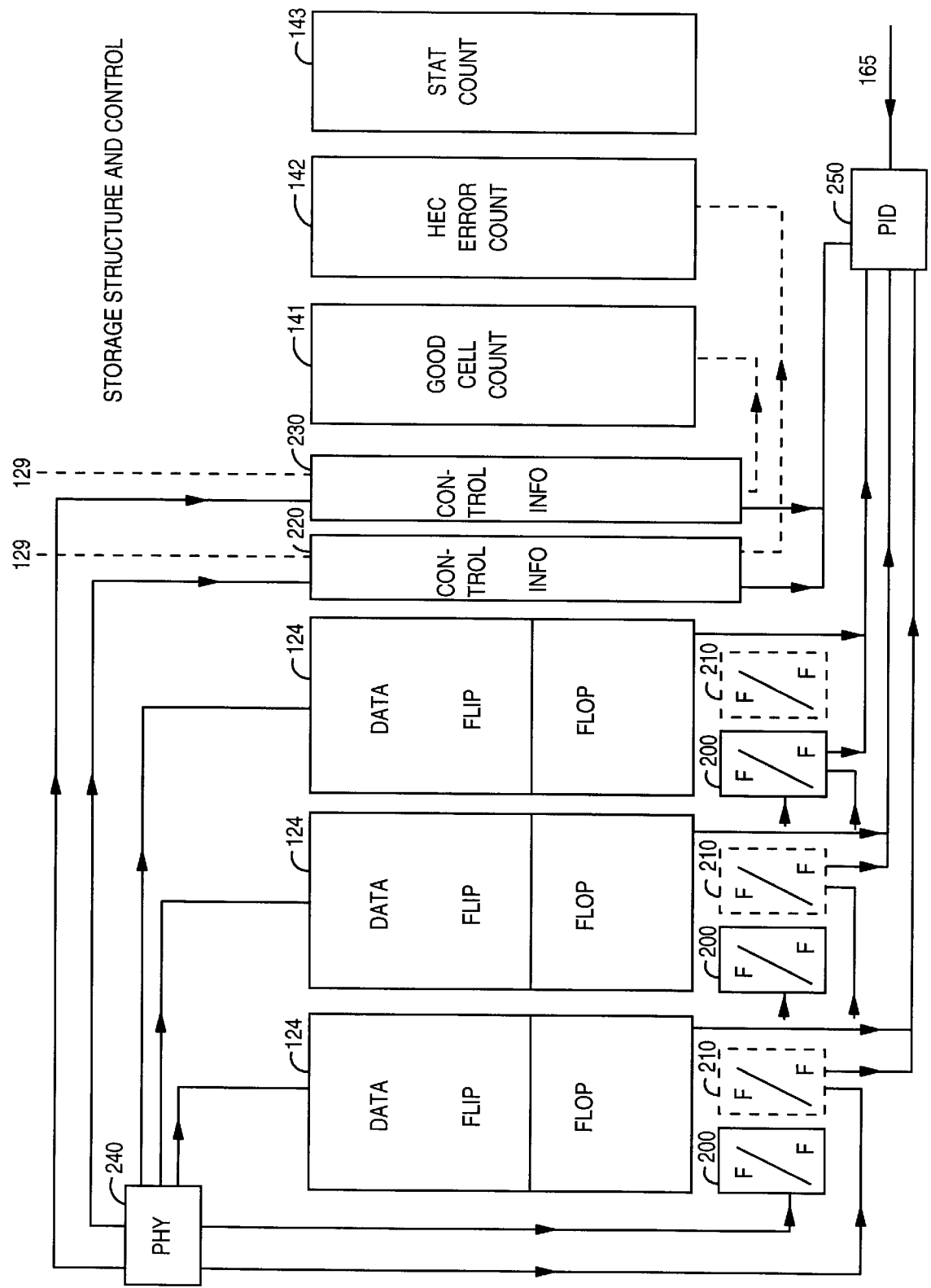
FIG. 7 illustrates the usage of storage structure and control according to the present invention.

FIG. 7 illustrates some essential characteristics of the hardware structure to support the difference of input and output data rate. More particularly, the byte Write operations in the data storage and in the control information storage of the island logical blocks must opearate at a rate sustaining the input aggregate media speed rate. On the other hand, the word Read operations of the scanning-multiplexing logic (149) can be halted, for very short periods of time (compared to a Read operation time) and from time to time, by an external control signal (165) as illustrated in FIGS. 3 and 7. The external control signal 165 is generated by external bus control unit 169 (FIG. 3). The control signal 165 gives authorization to use the bus 170. The origin of this limitation, as already explained, is the sharing of the external bus (170) with other layers in the network equipment. In consequence, the Read accesses of the generalized logical block (150) and the Write accesses of the per-island processing logical block (130) cannot be synchronised. In FIG. 7, there is one first scanning counter, the PHY counter (240) controlling the per-byte Write operations rate for all the island logical blocks into the island data storage elements (124); another scanning counter, the PID counter, which is independent from the PHY counter and located in the generalized logical block (150) controls the per-word Read operations rate on the same storage elements (124). The scanning sequence of the PHY counter is 'port 1 to N' simultaneously for all the islands; the scanning sequence of the PID counter, if there are P islands in the implementation, is 'island 1, from port 1 to N, island 2, from port 1 to N . . . island P, from port 1 to N'. As illustrated in FIG. 7, the PHY counter multiplexes also the data sent by the generalized logical block logics (142, 144, 146).

As a consequence of the desynchronization of Read and Write access rates the island data storage elements used for word reassembly are organized for Flip/Flop mode accesses. The RAM element is divided, for each data word to be written and read at a different time, into two areas: at each given time one area only is ready to be read. The valid area is pointed to by a Flip/Flop bit pointer. The island data storage elements (124) receive bytes reassembled into 4 byte words; as illustrated in FIG. 7, they are divided into two areas of N words, 4 words of 4 bytes in the preferred embodiment. One 4 bit RAM per island storage element, used as a F/F (Flip/Flop) pointer will indicate at each given time, which among the Flip and Flop words is ready to be read and this for each of the 4 ports. Before each byte write operation, the F/F RAM is read to find the area to be written; after each operation of writing, only when one 4 byte word is completed, the F/F pointer is updated.

Two essential features of the invention are due to the fact that it is impossible to read under the control of the PID counter, some data which are written in RAMs under the control of the PHY counter.

The first problem encountered is the impossibility to read the RAM F/F pointer of the RAM island data storage elements (124). This RAM is accessed in Read and Write at the rate of the PHY counter. One Read operation is performed at each byte arrival on one port. With the constraint of consecutive Read/Write access on these RAMs (FIG. 8), all the Read slots are used by the byte Read operations for each port under the control of the PHY counter. Only some Write slots are used, still under the control of PHY, for updating of the F/F value when a word is completed. The solution of the invention is to have for each F/F RAM a F/F 'shadow RAM', written simultaneously with the same information than the F/F RAM under the control of the PHY counter. As all the Read slots are free in this RAM, the Read operations, under the control of the PID counter will always be possible.

The second problem is to read, under the control of the PID counter, some control information written in the island control information RAMs (127) under the control of the PHY counter. It is a fact that, for processing HEC error counters or other statistical counting operations in the generalized logical blocks the logics (142, 144, 146) need to access information issued by the island processing (123). For the same reasons than with the F/F RAM the data cannot be read in RAMs at the PID rate because there is no read slot available in the access timing to these RAMs. The solution of the invention is to create some 'interface control storage' RAMs; these RAMs will store information written at the rate of the PHY counter and will be read by generalized logical block logics (142, 144, 146) at the rate of the PID counter. As an example, the control information (129) written by the island HEC error check detection in an interface control storage (220); this interface control storage (220), one per island logical bloc, is then read at the rate of the PID counter to feed the HEC error cell counting function (142). One other example of usage of interface control storage is illustrated in FIG. 7; one other control information (129) is written by an island byte counter (one island function not illustrated in FIG. 5 for simplification) in an interface control storage (230), one per island logical bloc; this interface control storage (230) is then read at the rate of the PID counter to feed the good cell counting function (143). In FIG. 7 the lines issued from the PHY and PID counters represent the control by these counters on the shared storage elements; the dotted lines represent write and read of control information in and from the interface control storage elements. The words read in the data storage elements are multiplexed and sent to the bus, still under the control of the PID counter. In the preferred embodiment the PID counter controls also the multiplexing of data issued by the generalized logical block logics (142, 144, 146) onto the bus (170).

In the Transmit direction, at the port level, byte times are detected according to the network clock; at the island level, word times are detected (4 byte word in the preferred embodiment) and a status 'word expected' in a per-port dedicated status area; under the control of the PID counter, all the ports of all the islands are scanned and if a word time has been detected for a given port, a request-for-read command generated in the generalized processing logical block is sent onto the bus (170) to the upper ATM layer; the word status is reset in the word stus storage area. After a fixed response time, a data word is sent back for the same port by the ATM upper layer onto the bus. If no data is ready to be sent, one bit in the data word indicates that it is a void word. Each data word received for the corresponding port is written in its corresponding island Flip/Flop word data storage element. Under the control of the PHY counter sustaining media speed, each port word data storage element is read and processed in its island. The island processing in the Transmit direction comprises the steps of byte boundary generation, HEC generation, and byte scrambling; the bytes are sent for port processing; the processing of the byte in the Transmit direction at the port level comprises the steps of translation of network equipment clock into network clock, 4 bits to 5 bits encoding, serialization into a bit stream which is NRZI encoded before being sent to the media dependent physical interface for transmission onto the network link.

We claim:

1. A method for use in the Receive physical interface of a network equipment having more than one port connected to packet network links; said method for use with storage elements accessed only with 2 consecutive Read and Write operations for one processing cycle; said method processing the port bit streams received at media speed and sending processed data onto a bus (170) of the network equipment, the access to said bus being under the control of a control signal (165) generated by an external control unit (169); said method characterized in that it comprises the steps of:

performing at media speed a per-port bit stream processing including byte reassembly;

grouping reassembled bytes from more than one port for processing with shared logics and storage elements arranged in at least one island;

scanning, under the control of a first counter, simultaneously for all the islands, the port byte streams of each island; for each port scanned, receiving a byte, performing a per-island port byte stream processing and, in each island, writing the processed port bytes in one of two port word areas of more than one byte of the island data storage element pointed by a first island Flip/Flop pointer storage elements;

each time a full word is written, updating said first Flip/Flop pointer and a second Flip/Flop pointer with the alternate port word area pointing value, setting an island word port status area to 'word ready' for the corresponding port;

scanning, under the control of a second counter, itself controlled by the external control signal (165), the status of all the ports in all the island status areas; for each word selected, if the status is 'word ready', reading the word in among two port word areas of the island data storage element pointed by said second Flip/Flop pointer storage element, resetting the word port status area, and sending said word onto the bus.

2. The method of claim 1 being characterized in that it further comprises the steps of:

in each island, writing, under the control of said first counter per-port control information in island interface storage elements, grouping shared logics and storage elements for control information processing generalized to all ports, under the scanning of said second counter, reading each per-port control information in the island interface storage elements, processing said per-port information, sending processed information onto a control bus.

3. The method of anyone of claim 1 or 2 implementing one Transmission Convergence sublayer specified at the ATM Forum, the packet network being an ATM (Asynchronous Transfer Mode) network; said method being further characterized in that the port processing further comprises the functions of network clock translation into network equipment clock, 5 to 4 bits decoding and generation of cell delineating commands, the island processing comprises the functions of descrambling, byte counting and HEC checking, the generalized processing comprises at least the functions of cell counting and HEC error counting.

4. The method of claim 3 used for the integration of the Transmission Convergence sublayer characterized in that it supports twelve 25.6 Mb/s ports grouped in 3 islands of 4 ports each and where the data words are 4 bytes words.

5. An apparatus for use in the Receive physical interface of a network equipment having more than one port connected to packet network links; said method for use with storage elements accessed only with 2 consecutive Read and Write operations for one processing cycle; said method comprising a step of processing the port bit streams received at media speed and sending data onto a bus (170) of the network equipment, the access to said bus being under the control signal (165) of an external control unit (169); said apparatus being characterized in that it comprises the means carrying out the steps of the method of anyone of claims 1 to 4.

6. A method for use in the Transmit physical interface of a network equipment having more than one port connected to packet network links; said method for use with storage elements accessed only with 2 consecutive Read and Write operations for one processing cycle; said method receiving data from a bus (170) of the network equipment, the access to said bus being under the control signal (165) of an external control unit (169), processing said data and transmitting port bit streams at media speed; said method being characterized in that it comprises the steps of:

grouping shared logics and storage elements by more than one island of more than one port;

counting at each port a word of more than one byte, time; at each word time setting a status 'word expected' in an island word port status area;

scanning under the control of a first counter, the status of all the port in all the island port status areas;

if the status is 'word expected', sending a request-for-read command to the bus to fetch a word for the corresponding port and resetting the word port status, after a fixed response time, receiving a word on the bus and writing it in one of two port word areas of an island data storage element pointed by a first island Flip/Flop pointer storage element;

scanning by byte, under the control of a second counter, simultaneously for all the islands, the port word byte of the island data storage elements pointed by the first island Flip/Flop pointer storage element; for each port scanned, reading the port byte in one of two port word areas of the island data storage element pointed by a second island Flip/Flop pointer storage element; each time the last byte of a port word is read, updating said first and second island Flip/Flop pointer storage element with the alternate port word area pointing value, performing a per-island port byte stream processing; and sending processed byte for performing a per-port byte stream processing including byte deserialization; and transmitting said port bit streams at media speed.

7. The method of claim 6 being characterized in that it further comprises the steps of:

in each island, writing, under the control of said first counter per-port control information in island interface storage elements, grouping shared logics and storage elements for control information processing generalized to all ports, under the scanning of said second counter, reading each per-port control information in the island interface storage elements, processing said per-port information, sending processed information onto a control bus.

8. The method of anyone of claim 6 or 7 implementing one Transmission Convergence sublayer specified at the ATM Forum, the packet network being an ATM (Asynchronous Transfer Mode) network; said method being further characterized in that the generalized processing comprises at least the functions of cell counting, the island processing comprises the functions of scrambling, byte counting and HEC generation, the port processing further comprises the functions of network equipment clock translation into network clock, 4 to 5 bits encoding and generation of cell delineating commands.

9. The method of claim 8 used for the integration of the Transmission Convergence sublayer characterized in that it supports twelve 25.6 Mb/s ports grouped in 3 islands of 4 ports each and where the data words are 4 bytes words.

10. An apparatus for use in the Transmit physical interface of a network equipment having more than one port connected to packet network links; said method for use with storage elements accessed only with 2 consecutive Read and Write operations for one processing cycle; said method receiving data from a bus (170) of the network equipment, the access to said bus being under the control signal (165) of an external control unit (169), processing said data and transmitting port bit streams at media speed; said apparatus being characterized in that it comprises the means carrying out the steps of the method of anyone of claims 6 to 9.

11. A method for processing data in a multiport chip of a network device including the acts of:

performing at media speed a per-port bit stream processing including byte reassembly;

providing at least one island processing circuit arrangement including a storage element for data storage, elements for control information, descrambler, polynomial generator logic and pseudo random number generator, said processing circuit arrangement receiving groups of reassembled bytes for multiple ports processing and generating and storing multi-byte words in said storage element for data; and scanning with a scanning multiplexing circuit arrangement the storage element for data and multiplexing onto a bus selected entries from selected storage elements for data.

12. A device for use in a multiport chip of a networking device including:

means for performing at media speed a per-port bit stream processing including byte reassembly;

means for providing at least one island processing circuit arrangement including a storage element for data storage, elements for control information, descrambler, polynomial generator logic and pseudo random number generator, said processing circuit arrangement receiving groups of reassembled bytes for multiple ports processing and generating and storing multi-byte words in said storage element for data; and means for scanning with a scanning multiplexing circuit arrangement the storage element for data and multiplexing onto a bus selected entries from selected storage elements for data.

* * * * *